(12) United States Patent
Sakai et al.

(10) Patent No.: US 7,032,968 B2
(45) Date of Patent: Apr. 25, 2006

(54) OCCUPANT JUDGING DEVICE FOR A VEHICLE SEAT

(75) Inventors: Morio Sakai, Toyota (JP); Masaki Mori, Kariya (JP); Koji Aoki, Nagoya (JP); Minoru Izawa, Okazaki (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 379 days.

(21) Appl. No.: 10/364,324

(22) Filed: Feb. 12, 2003

(65) Prior Publication Data
US 2003/0168895 A1    Sep. 11, 2003

(30) Foreign Application Priority Data
Feb. 12, 2002   (JP)   ............... 2002-034453

(51) Int. Cl.
*A47C 31/00*   (2006.01)
*B60R 21/00*   (2006.01)

(52) U.S. Cl. ............... 297/217.2; 297/217.3; 280/735

(58) Field of Classification Search ............ 297/217.2, 297/217.3; 280/735
See application file for complete search history.

(56) References Cited

U.S. PATENT DOCUMENTS

| | | | | |
|---|---|---|---|---|
| 6,007,094 A | * | 12/1999 | Hosoda | 280/735 |
| 6,264,236 B1 | * | 7/2001 | Aoki | 280/735 |
| 6,509,653 B1 | * | 1/2003 | Fujimoto et al. | 307/10.1 |
| 6,662,094 B1 | * | 12/2003 | Murphy et al. | 701/45 |
| 6,727,823 B1 | * | 4/2004 | Ando et al. | 340/666 |

FOREIGN PATENT DOCUMENTS

JP      9-207638 A    8/1997

* cited by examiner

*Primary Examiner*—Anthony D. Barfield
(74) *Attorney, Agent, or Firm*—Buchanan Ingersoll PC

(57) ABSTRACT

An occupant judging device for a vehicle seat includes a load sensor provided in the vehicle seat and a controller for calculating a detected load value based on an output load value from the load sensor and determining an occupant on the vehicle seat by comparing the detected load value and a predetermined threshold value. The controller judges by a decrease state of the detected load value detected after the seatbelt is fastened being maintained for a first predetermined time that a child restraint device is installed, when a state in which the seatbelt is fastened and the door is opened is detected. Further, the controller judges by a decrease state of the detected load value detected after the seatbelt is fastened being maintained for a second predetermined time that the child restraint device is installed, when a state in which the seatbelt is fastened and the door is closed is detected.

18 Claims, 5 Drawing Sheets

OCCUPANT JUDGING DEVICE FOR A VEHICLE SEAT

This application is based on and claims priority under 35 U.S.C. § 119 with respect to Japanese Application No. 2002-034453 filed on Feb. 12, 2002, the entire content of which is incorporated herein by reference.

FIELD OF THE INVENTION

This invention generally relates to an occupant judging device for a vehicle seat. More particularly, the present invention pertains to an occupant judging device for a vehicle seat operated based on a weight value outputted from a weight sensor provided at a seat body.

BACKGROUND OF THE INVENTION

In case where an air bag is provided for protecting an occupant sitting on a vehicle seat, an occupant judging device for a vehicle seat has been provided at the vehicle seat for determining whether an occupant is seated or not on the corresponding seat, the occupant is an adult or a child, or the like. Japanese Patent Laid-open Publication No. H09-207638 discloses a known occupant judging device. The disclosed device includes a plurality of weight sensors provided at a plurality of fixing positions respectively of a seat body with respect to a vehicle floor, and a controller for calculating a detection weight value based on weight values outputted from the plurality of weight sensor and for determining whether an occupant is seated on the vehicle seat or not based on the calculated detection weight value. More specifically, the controller calculates a detection weight value by summing up the detection values outputted from the plurality of weight sensors respectively by an adder, compares this detection weight value with a weight value set in advance (threshold value for determination), and determines whether an occupant is seated on the vehicle seat or not by comparing the detection weight value and the threshold for judgment.

The vehicle seat on a passenger side may be equipped with a CRS (Child Restraint System). Thus, when the occupant judging is preformed, a state whether the CRS is equipped or not is included in judgment to prevent a case in which a child sitting on the CRS installed on the seat is misjudged as an adult.

The CRS is generally equipped on the seat body with a seatbelt. It has been confirmed that when the CRS is installed on the seat, a large load is added to the seat by tightening with the seatbelt, and is decreased after the CRS is tightened with the seatbelt. Thus, it is proposed that the detection weight value after the seatbelt is fastened is monitored and a CRS judgment (judging whether the CRS is installed or not) is performed by detecting an action of installing the CRS.

However, if an adult sitting on the seat leans against a door and thus his/her hip is lifted up, the detection weight value may be decreased. This situation can be misjudged as the CRS installation according to the detection weight decrease.

Thus, a need exists for an occupant judging device for a vehicle seat which can prevent a child restraint system from being misjudged as installed.

SUMMARY OF THE INVENTION

According to an aspect of the present invention, an occupant judging device for a vehicle seat includes a load sensor provided in the vehicle seat and a controller for calculating a detected load value based on an output load value from the load sensor and determining an occupant on the vehicle seat by comparing the detected load value and a predetermined threshold value. The occupant judging device further includes a first detecting means for detecting whether a seatbelt is fastened or not and a second detecting means for detecting whether a door is opened or closed. The controller judges that a child restraint device is installed by a decrease state of the detected load value detected after the seatbelt is fastened being maintained for a first predetermined time when a state in which the seatbelt is fastened and the door is opened is detected. The controller also judges that the child restraint device is installed by a decrease state of the detected load value detected after the seatbelt is fastened being maintained for a second predetermined time when a state in which the seatbelt is fastened and the door is closed is detected.

The decrease state of the detected load value is represented either by a state in which a ratio of the detected load value to an approximate maximum value of the detected load value detected after the seatbelt is fastened falls below a predetermined ratio, or by a state in which the detected value falls below a second predetermined value from a value over a first predetermined value.

The first detecting means is a belt anchor switch and the second detecting means is a courtesy switch.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

The embodiment of the present invention is explained hereinafter with reference to drawings.

A vehicle seat equipped with an embodiment of the present invention is explained hereinafter with reference to FIGS. 1 to 6.

Figure 1:
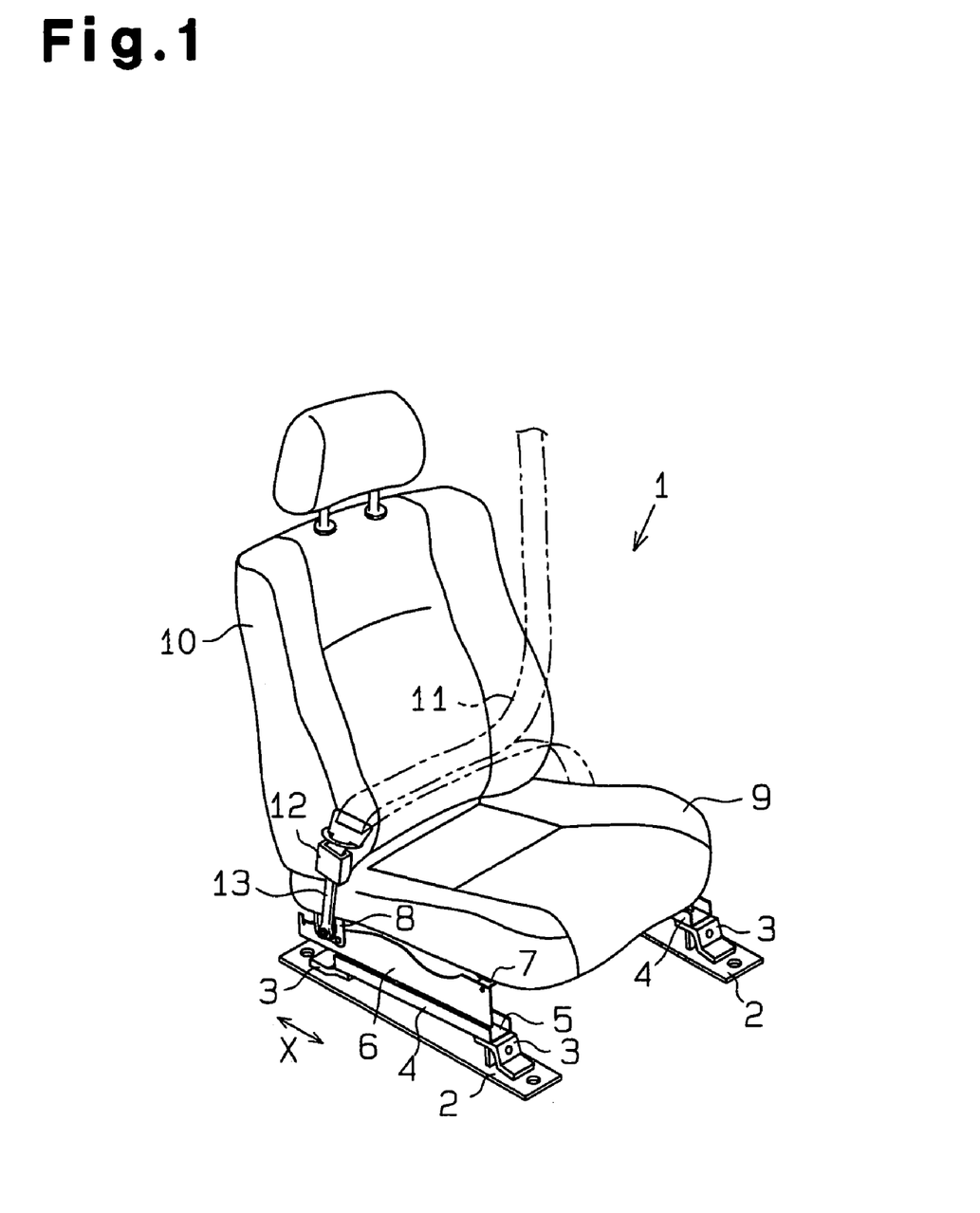
FIG. 1 is a perspective view showing a vehicle seat according to an embodiment of the present invention.

FIG. 1 is a perspective view of a seat body 1 installed in a vehicle. This seat body 1 is placed in a front passenger seat.

In FIG. 1, a symmetric pair of support frames 2 is fixed in back and forth directions (arrow X direction in FIG. 1) of a vehicle floor, not shown in the drawing.

A pair of brackets 3 is fixed to the upper surface of each support frame 2 in the back and forth directions (vehicle longitudinal direction). A lower rail 4 is fixed to the pair of brackets 3 in a supporting way in the back and forth directions along the support frame 2. A pair of lower rails 4 in the right and left directions has a U-shape in cross section, which upper portion is opened and extends in the back and forth directions for forming a slide channel 5.

Figure 2:
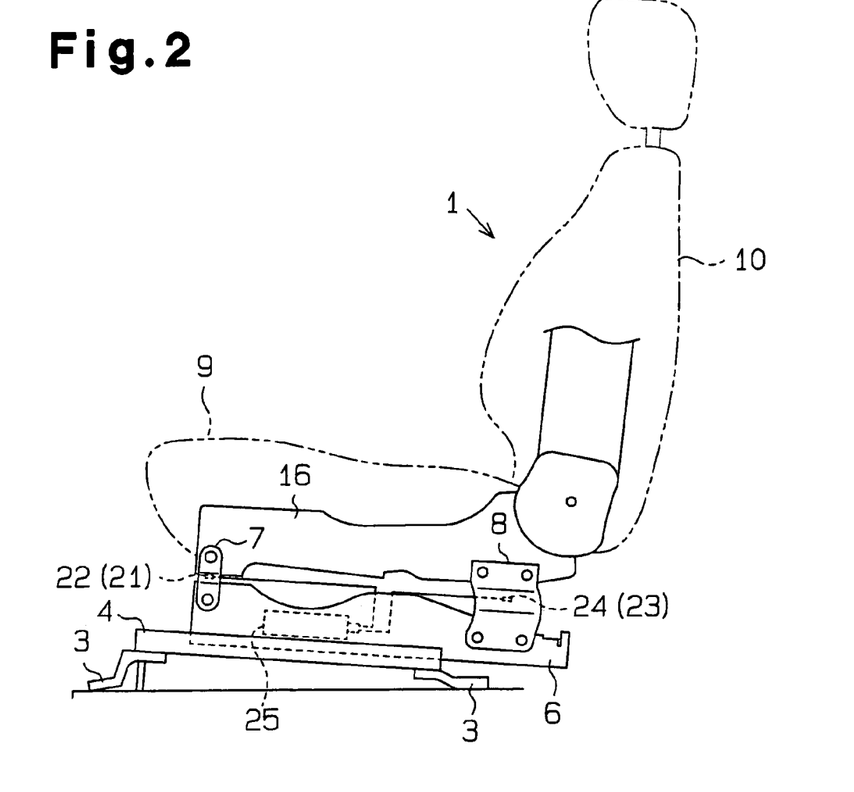
FIG. 2 is a side view showing the vehicle seat according to the embodiment of the present invention.

In the slide channel 5 formed in each lower rail 4, a symmetrical pair of upper rails 6 is provided along the slide channel 5 in the back and forth directions in a sliding way. As indicated in FIG. 2, each lower arm 16 supporting a seat back 10 and a seat cushion 9 of the seat body 1 is connected to each upper rail 6 by keeping a predetermined distance between the lower arm 16 and the upper rail 6 via each of a symmetrical set of front side sensor brackets 7 and back side sensor brackets 8.

Figure 3A:
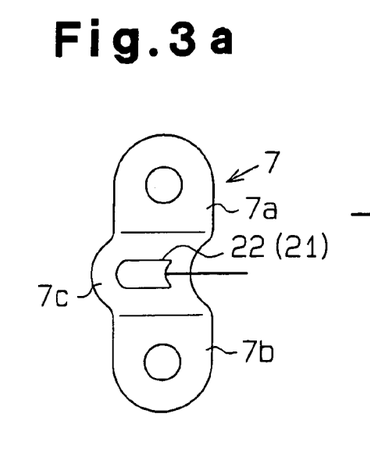
FIG. 3a is a front view showing a front side sensor bracket.

As shown in FIG. 3A, the front side sensor bracket 7 has an upper side fastener portion 7a at an upper portion and a lower side fastener portion 7b at a lower portion. A bending portion 7c is formed by bending a portion between the upper side fastener portion 7a and the lower side fastener portion 7b. This front side sensor bracket 7 is connected to a front side portion of the upper rail 6 and the lower arm 16 respectively by means of the upper side fastener portion 7a and the lower side fastener portion 7b. Then, a front right-hand side weight sensor 21 and a front left-hand side weight sensor 22 each functioning as a weight sensor are attached to the bending portion 7c of the front side sensor bracket 7 at the right and left sides. Each of the front right-hand side weight sensor 21 and the front left-hand side weight sensor 22 is equipped with a strain detecting device such as a strain gage, for example, and electrically detects a bending degree of the bending portion 7c bending in response to the weight applied to the seat cushion 9.

Figure 3B:
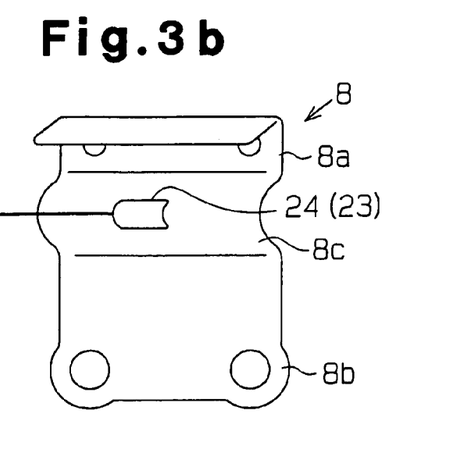
FIG. 3b is a front view showing a back side sensor bracket.

As shown in FIG. 3b, the back side sensor bracket 8 has an upper side fastener portion 8a at an upper portion and a lower side fastener portion 8b at a lower portion. A bending portion 8c is formed by bending a portion between the upper side fastener portion 8a and the lower side fastener portion 8b. This back side sensor bracket 8 is connected to a back side portion of the upper rail 6 and the lower arm 16 respectively by means of the upper side fastener portion 8a and the lower side fastener portion 8b. Then, a rear right-hand side weight sensor 23 and a rear left-hand side weight sensor 24 each functioning as a weight sensor are attached to the bending portion 8c of the back side sensor bracket 8 at the right and left sides. Each of the rear right-hand side weight sensor 23 and the rear left-hand side weight sensor 24 is, in the same way as the front right-hand side weight sensor 21 and the front left-hand side weight sensor 22, equipped with a strain detecting device such as a strain gage, for example and electrically detects a bending degree of the bending portion 8c bending in response to the weight applied to the seat cushion 9.

Figure 4:
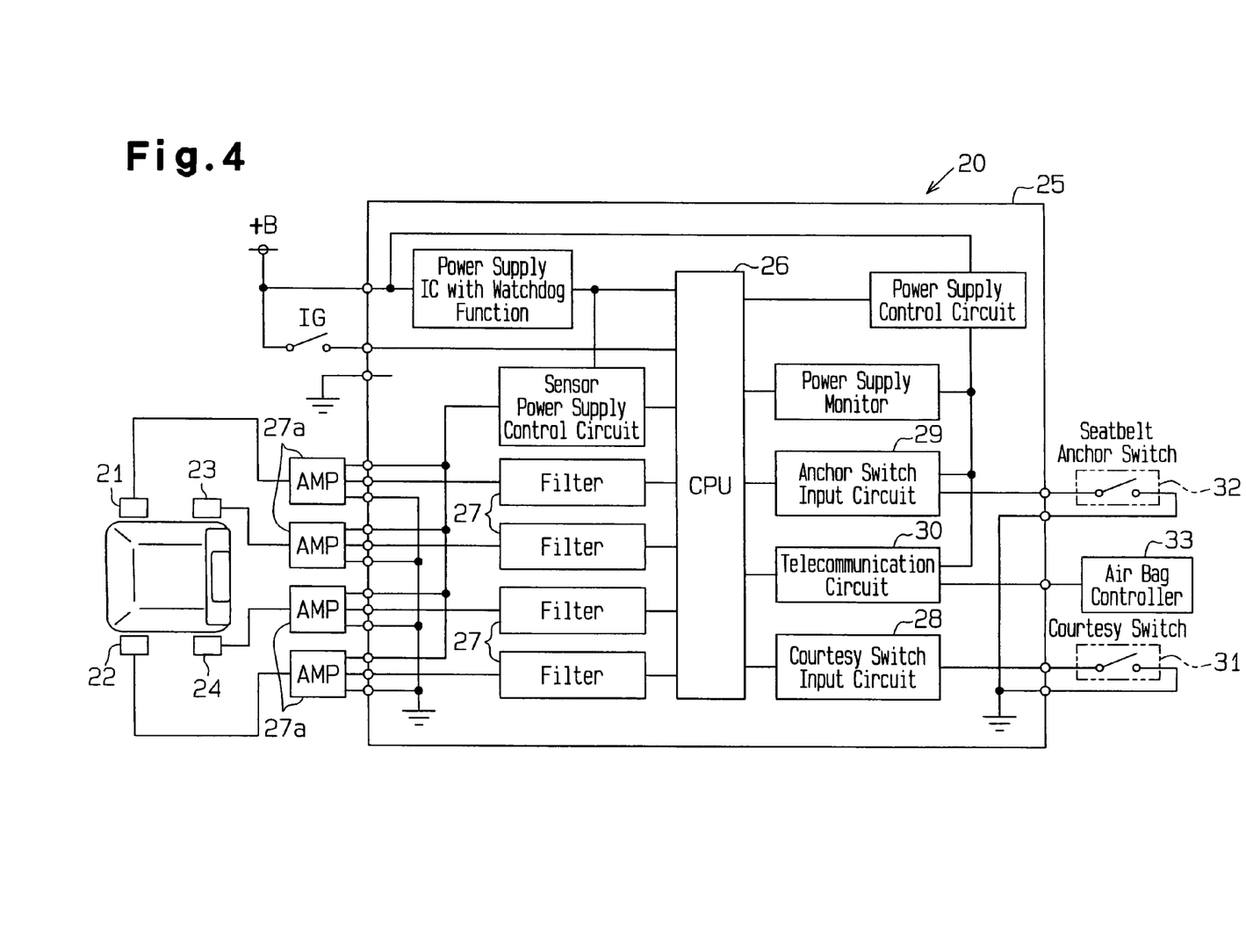
FIG. 4 is a block diagram showing an electrical structure of the embodiment of the present invention.

As shown in FIG. 1, an anchor bracket 13 of a belt anchor 12 for connecting a seatbelt 11 is connected to one side of the upper rail 6 (left-hand side of FIG. 1). FIG. 4 is a block diagram of an electrical structure of an occupant judging device 20 provided in the vehicle seat. This occupant judging device 20 is equipped with the weight sensors 21 to 24, a controller 25, a courtesy switch 31, and a seatbelt anchor switch 32.

The controller 25 is equipped with a CPU (Central Processing Unit) 26, a filter 27, a courtesy switch input circuit 28, an anchor switch input circuit 29, and a telecommunication circuit 30.

The filter 27 receives a weight signal from the weight sensors 21 to 24 by way of an amplifier 27a and inputs the weight signal to the CPU 26. The CPU 26 calculates respective output weight values FR and FL per respective weight sensors 21 and 22 based on the weight signal from the front right-hand side weight sensor 21 and the front left-hand side weight sensor 22 passing through the amplifier 27a and the filter 27. Further, in the same way the CPU 26 calculates respective output weight values RR and RL per respective weight sensors 23 and 24 based on the weight signal from the rear left-hand side weight sensor 24 and the rear right-hand side weight sensor 23 passing through the amplifier 27a and the filter 27. A detection weight value S is calculated by summing up these weight values FR to FL.

The courtesy switch 31 is turned ON by opening a door (not shown in the drawing) at a side of the seat body 1 (passenger seat). The courtesy switch 31 is generally used for turning a room light on. The detecting signal (ON or OFF) from this courtesy switch 31 is input to the CPU 26 by way of the courtesy switch input circuit 28, and accordingly the CPU 26 can detect whether the door is open or closed.

The seatbelt anchor switch 32 is turned ON by fastening the seatbelt 11 to the belt anchor 12. The detecting signal (ON or OFF) from this seatbelt anchor switch 32 is input to the CPU 26 by way of the anchor switch input circuit 29, and accordingly the CPU 26 can detect whether the seatbelt 11 is fastened or not.

The CPU 26 performs various kinds of calculating processes in accordance with initial data, control programs, and so forth, which are stored in advance. The calculating results thereof, i.e., occupant judging results, are output to the telecommunication circuit 30. The calculating results thereof are output to an air bag controller 33 by way of the telecommunication circuit 30, and then the function of an air bag device is controlled.

Figure 5:
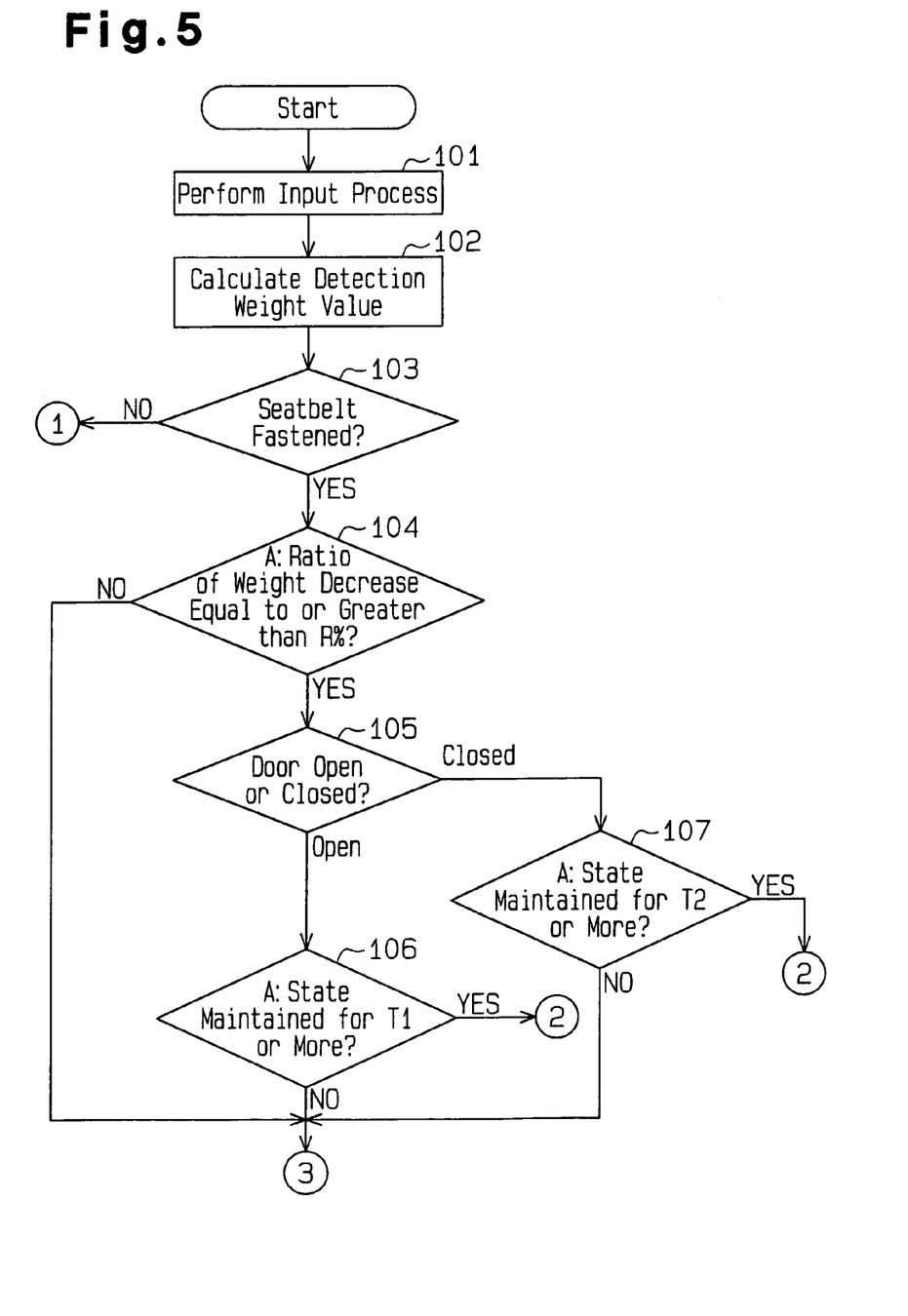
FIG. 5 is a flowchart showing a first half of an occupant judging operation according to the embodiment of the present invention.

Next, the processing aspect and others, such as judging passengers or occupants of the vehicle seat and the like of the present embodiment, are explained with reference to the flowcharts of FIGS. 5 and 6. This procedure is performed by way of a timely interrupting operation per predetermined time.

If the process transits to this routine, first at a step S101, the CPU 26 performs an input process. To give an actual example, the CPU 26 reads-in weight signals of respective weight sensors 21 to 24 which are filter-processed by the amplifier 27a and the filter 27, and calculates weight values FR to RL per respective weight sensors 21 to 24. In addition, the CPU 26 reads-in the detecting signal (ON or OFF) from the courtesy switch 31 by way of the courtesy switch input circuit 28 and detects a status of opening and closing of the door. Further, the CPU 26 reads-in the detecting signal (ON or OFF) from the seatbelt anchor switch 32 by way of the anchor switch input circuit 29 and detects the fastening status of the seatbelt 11.

Then, at a step S102, the CPU 26 sums up the weight values FR to RL per respective weight sensors 21 to 24, calculates the detection weight value S, and then transits to a step S103.

At the step S103, the CPU 26 judges whether or not the seatbelt 11 is presently fastened. To give an actual example, it is judged that the seatbelt 11 has been fastened if the detecting signal from the seatbelt anchor switch 32 is turned ON, and it is judged that the seatbelt 11 has not been fastened if the detecting signal from the seatbelt anchor switch 32 is turned OFF.

It should be noted here that if it is judged that the seatbelt 11 has been fastened, the CPU 26 transits to a step S104 and judges whether or not the condition, in which the ratio of weight decrease is turned to be more than or equal to a predetermined ratio R (%), is caused. This ratio of weight decrease is a value expressed by a ratio, in which the differential value (decreasing value) of the detection weight value S from the approximate maximum value of the detection weight value S detected after fastening the seatbelt 11 is expressed, for example. The larger the ratio of weight decrease is, the more the weight decreases. In general, in an operation of fastening CRS (Child Restraint System) to a vehicle seat, heavy weight is added by fastening the seatbelt and the weight decreases by releasing thereafter. The present device of the embodiment detects that CRS is actually installed (CRS is installed in the seat) by detecting the characteristics at the time of installing CRS. The predetermined ratio R is set as an appropriate value for detecting the weight fluctuation (decrease) at the time of installing CRS.

At the step S104, if it is judged that the ratio of weight decrease is more than or equal to the predetermined ratio R (%), the CPU 26 transits to a step S105 and judges whether the door is opened or closed. To give an actual example, the status of opening or closing the door is judged in accordance with an ON/OFF status of the courtesy switch 31 to the seat of corresponding door. If it is judged that the door is in an open condition, the CPU 26 transits to a step S106 and judges whether or not the state, in which the ratio of weight decrease is more than or equal to the predetermined ratio R (%), remains for a first predetermined time T1. This first predetermined time T1 is set as an optimal value for allowing a CRS installation to be detected by decreasing of the weight up to a time before the first predetermined time T1 is over even if the detection weight value S is increased again by further fastening the seat in order to adjust the seat after installing CRS and/or a child is seated in CRS. Namely, the CRS is judged by the weight, which is decreased for a short time period in the open condition of the door. While the door is in the open condition, it is difficult to lean against the door and accordingly, there is little possibility of weight decreasing by an adult who changes his/her seating posture or style on the seat. On the other hand, if it is judged that the door is in a closed condition, the CPU 26 transits to a step S107 and judges whether or not the state, in which the ratio of weight decrease is more than or equal to the predetermined ratio R (%), remains for a second predetermined time T2 longer than the first predetermined time T1. This second predetermined time T2 is set as an optimal value for allowing a temporary seating posture change to be excluded even if an adult who sits on the seat, for example, leans against the door, lifts up his/her hip, and the detection weight value S is decreased. Namely, since it is impossible to maintain such an unnatural style for a long time, the CRS is judged as being installed by the weight which is decreasing for a relatively longer time in the closed condition of the door. In the closed condition of the door, since it is difficult to install the CRS, there is little possibility of installing CRS to the seat.

The predetermined times T1 and T2 are detected by the CPU 26 counting the number of calculating periods in which the above-mentioned decrease conditions are continuously detected. Alternately, an inner timer devise may be used to detect the predetermined times T1 and t2.

If it is judged at the step S106 that the condition, in which the ratio of weight decrease is more than or equal to the predetermined ratio. R (%), continues for the first predetermined time T1, or if it is judged at the step S107 that the condition, in which the ratio of weight decrease is more than or equal to the predetermined ratio R (%), continues for the second predetermined time T2, the CPU 26 determines that the detection weight value S decreases in accordance with the CRS installation. Then, the CPU 26 transits to a step S112 of FIG. 6 and registers the judgment status of the CRS in the memory, and temporally terminates the process thereafter.

Figure 6:
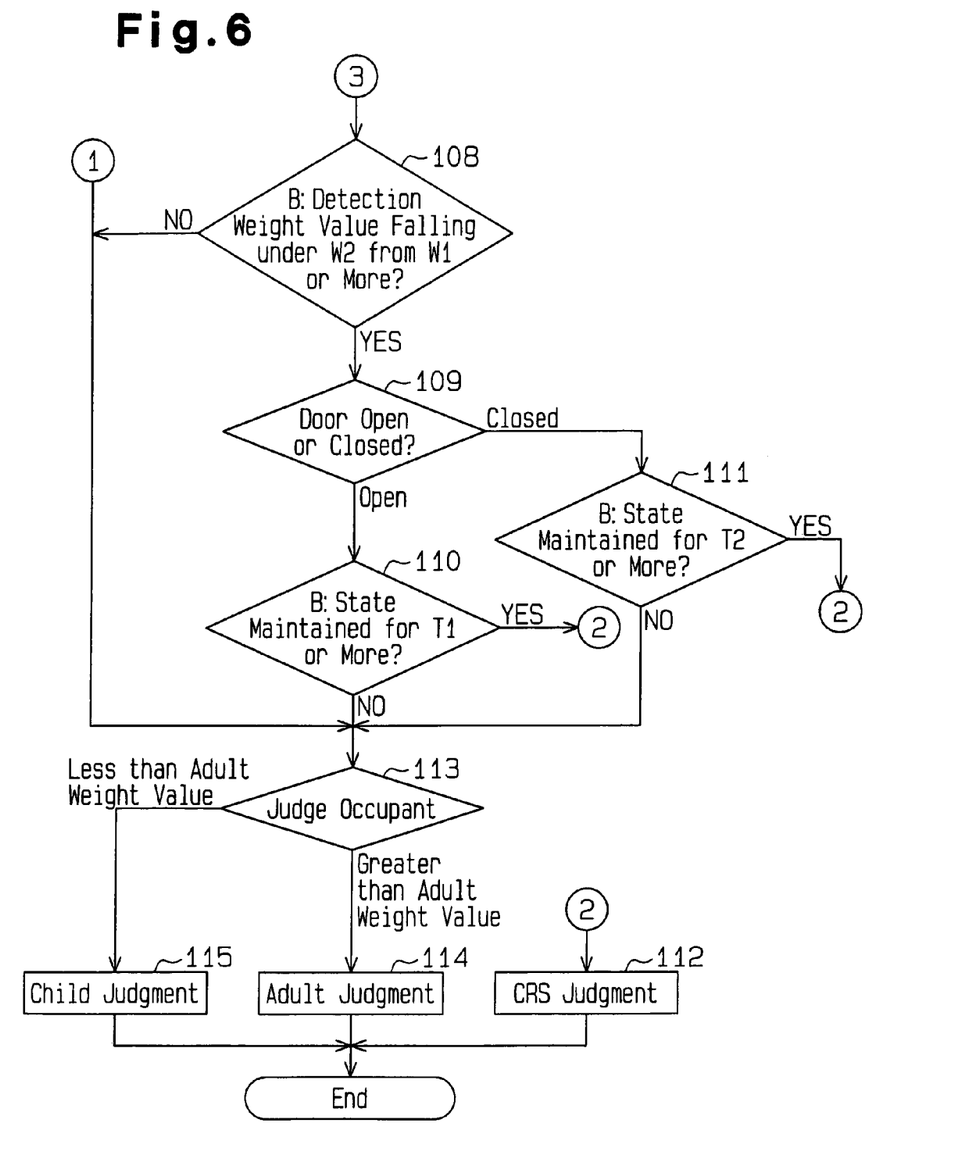
FIG. 6 is a flowchart showing a second half of the occupant judging operation according to the embodiment of the present invention.

Further, if it is judged at the step S106 that the condition, in which the ratio of weight decrease is more than or equal to the predetermined ratio R (%), does not continue for the first predetermined time T1, or if it is judged at the step S107 that the condition, in which the ratio of weight decrease is more than the predetermined ratio R (%), does not continue for the second predetermined time T2, the CPU 26 transits to a step S108 of FIG. 6. Otherwise, if it is judged at the step S104 that the condition, in which the ratio of weight decrease is more than the predetermined ratio R (%), is not caused, the CPU 26 transits directly to the step S108 of FIG. 6.

At the step S108, the CPU 26 determines whether or not the detection weight value S, which is detected after the seatbelt 11 is fastened, decreases the weight to the value under the second predetermined value W2 from the value over the first predetermined value W1 (W1>W2). These predetermined values W1 and W2 are set as optimal values for detecting fluctuation (decrease) of the weight at the time of installing the above-mentioned CRS.

At the step S108, if it is judged that the above-mentioned detection weight value S decreases to the value under the second predetermined value W2 from the value over the first predetermined value W1, the CPU 26 transits to a step S109 and judges whether or not the door is opened in the same way. If it is judged that the door is in the open condition, the CPU 26 transits to a step S110 and judges whether or not the condition, in which the weight decreases to the value under the second predetermined value W2, continues for the first predetermined time T1. On the other hand, if it is judged that the door is in the closed condition, the CPU 26 transits to a step S111 and judges whether or not the condition, in which the weight decreases to the value under the second predetermined value W2, continues for the second predetermined time T2.

If it is judged at the step S110 that the condition, in which the weight decreases to the value under the second predetermined value W2, continues for the first predetermined time T1, or if it is judged at the step S111 that the condition, in which the weight decreases to the value under the second predetermined value W2, continues for the second predetermined time T2, the CPU 26 judges that the detection weight value S decreases due to installing the CRS. Then, the CPU 26 transits to the step S112, registers the judgment status of the CRS in the memory, and then temporarily terminates the process thereafter.

Further, at the step S110, if it is judged that the condition, in which the weight decreases to the value under the second predetermined value W2, does not continue for the first predetermined time T1, or if it is judged at the step S111 that the condition, in which the weight decreases to the value under the second predetermined value W2, does not continue for the second predetermined time T2, the CPU 26 transits to a step S113. Then, the CPU 26 determines the passenger except the CRS. Otherwise, at the step S108 if it is judged that the condition, in which the weight decreases to the value under the second predetermined value W2, is not caused, the CPU 26 transits directly to the step S113 and determines the passenger except the CRS.

Further, at the step S103, if it is judged that the seatbelt 11 is not fastened, since such a state is impossible to occur in the case of installing the CRS, the CPU 26 transits directly to the step S113 and determines the passenger except the CRS.

At the step S113, the CPU 26 judges whether or not the detection weight value S is not lower than the predetermined adult weight value (threshold value for determination). This adult weight value is set as a preferable value for judging whether or not the passenger seating on the seat is an adult or a child. If it is judged that the detection weight value S is not lower than the adult weight value, the CPU 26 transits to a step S114 and registers an adult judgment in the memory. Further, at the step S113, if it is judged that the detection weight value S is less than the adult weight value, the CPU 26 transits to a step S115 and registers a child judgement in the memory.

The CPU 26, which has registered a judgment at any one of respective steps 112, 114, and 115 in the memory, terminates once the process thereafter. This judgment result is output to the air bag controller 33 by way of the telecommunication circuit 30 and the function of the airbag device is controlled as explained in the above.

According to the present embodiment, when it is detected that the seatbelt 11 is fastened and the door is in the open condition, it is judged that the CRS is installed to the seat body 1 since the condition, in which the detection weight value S decreases after the seatbelt 11 has been fastened, continues for the first predetermined time T1. Further, when it is detected that the seatbelt 11 is fastened and the door is in the closed condition, since the condition, in which the detection weight value S decreases after the seatbelt 11 is fastened, continues for the second predetermined time T2 longer than the first predetermined time T1, it is judged that CRS is installed to the seat body 1. In the case that the adult sits on the seat body 1, the condition in which the detection weight value S decreases is caused if the adult lifts his/her hip up by leaning against the door, for example. At this time, since the condition in which the detection weight value S decreases continues for a certain length of time (the first predetermined time T1), it may be misjudged that CRS has been installed. However, since time for determining the condition of decreasing the detection weight value S is set as a relatively longer time (the second predetermined time T2) in the closed condition of the door, such misjudgment can be avoided.

In the present embodiment, the condition in which the decrease of the detection weight value S is confirmed by a state in which the ratio of the detection weight value S to the approximate maximum value of the detection weight value detected after the seatbelt 11 is fastened falls below the predetermined ratio (i.e., state in which the ratio of weight decrease is equal to or more than the predetermined ratio R (%)). In addition, the decrease state of the detection weight value S is further recognized by a state in which the detection weight value S falls below the second predetermined value W2 from a value over the first predetermined value W1. Accordingly, it is possible to suppress the decrease state of the detection weight value S fails to be detected. For example, in the case that the weight of the CRS itself is heavy and/or a fastening load is large, the absolute detected decrease (lower than the second predetermined value W2) cannot occur. However, it is possible to suppress that the weight decrease fails to be detected by recognizing the ratio at the same time.

In the present embodiment, since it is detected whether the seatbelt 11 is fastened or unfastened by utilizing the existing seatbelt anchor switch 32 in the vehicle, it is possible to avoid increasing the number of parts.

In the present embodiment, it is detected to open or close the door by utilizing the existing courtesy switch 31 in the vehicle, it is possible to avoid increasing the number of parts. It should be noted here that the embodiment of the present invention is not limited to the above-mentioned embodiment, but can be modified in various ways, for example, as the following way.

In the above-mentioned embodiment, a method for calculating the ratio of the detection weight value S to the approximate maximum value of the detection weight value after the seatbelt 11 is fastened is one example, and further other methods therefor can be adopted. For example, it is possible to calculate the ratio of the detection weight value S divided by the approximate maximum value of the detection weight value detected after the seatbelt 11 is fastened. In this case, the decrease state of the detection weight value S is detected by the ratio being lower than the predetermined ratio.

In the above-mentioned embodiment, although it is detected whether the seatbelt 11 is installed or uninstalled by way of an ON/OFF condition of the seatbelt anchor switch 32, it may also be possible to detect by way of an ON/OFF condition in the case that the belt tension switch is installed. Even if the modification is made in such a way, the same effects as of the above-mentioned embodiment can be obtained.

In the above-mentioned embodiment, the symmetrical set of front right-hand side weight sensor 21 and front left-hand side weight sensor 22 is provided in the front portion of the seat body 1, and the symmetrical set of rear right-hand side weight sensor 23 and rear left-hand side weight sensor 24 is provided in the rear portion of the seat body 1. Although the number (4 elements) of sensors and the position thereof are used as an example, it is possible to adopt different number and position therefor. In short, one or more weight sensors are possibly positioned in the predetermined position of the seat body 1 and then the passengers can be identified by a relationship between the weight value of the weight sensor and the predetermined identification threshold value.

The shape of the front and back side sensor brackets 7 and 8 adopted in the embodiment is used as an example, if they are bent in accordance with the seat weight (seating load), the shapes thereof can be used arbitrarily.

Although the positions (front and back side sensor brackets 7 and 8) of installing the weight sensors 21 to 24 adopted in the above-mentioned embodiment are used as an example, the positions of installing them can be set arbitrarily if the seat weight value (seating load) can be detected.

According to the embodiment of the present invention as explained above, it is possible to suppress misjudging of installing the child restraint device.

In addition, an inaccurate detecting condition in which the detection weight value decreases can be suppressed. An increment of the number of parts can be also avoided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is

What is claimed is:

1. An occupant judging device for a vehicle seat provided with a seatbelt and mounted in a vehicle that includes a door, the occupant judging device comprising:
 a load sensor for detecting a load applied to the vehicle seat;
 a controller for calculating a detected load value based on an output from the load sensor and determining an occupant on the vehicle seat by comparing the detected load value and a predetermined threshold value;
 a first detecting means for detecting whether the seatbelt is fastened or not; and
 a second detecting means for detecting whether the door is opened or closed,
 wherein the controller judges that a child restraint device on the seat is installed by detecting a decrease state of the detected load value after the seatbelt is fastened being maintained for a first predetermined time when the seatbelt is fastened and the door is opened and the decrease state being maintained for a second predetermined time when the seatbelt is fastened and the door is closed.

2. An occupant judging device for a vehicle seat according to claim 1, wherein the decrease state of the detected load value is represented either by a state in which a ratio of the detected load value to an approximate maximum value of the detected load value detected after the seatbelt is fastened falls below a predetermined ratio, or by a state in which the detected load value falls below a second predetermined value from a value over a first predetermined value.

3. An occupant judging device for a vehicle seat according to claim 2, wherein the first detecting means is a belt anchor switch.

4. An occupant judging device for a vehicle seat according to claim 3, wherein the second detecting means is a courtesy switch.

5. An occupant judging device for a vehicle seat according to claim 1, wherein the first detecting means is a belt anchor switch.

6. An occupant judging device for a vehicle seat according to claim 5, wherein the second detecting means is a courtesy switch.

7. An occupant judging device for a vehicle seat according to claim 1, wherein the load sensor is provided at a sensor bracket having an upper fastener portion, a lower fastener portion, and a bending portion.

8. An occupant judging device for a vehicle seat according to claim 1, wherein the controller includes a CPU, filter, a courtesy switch input circuit, an anchor switch input circuit, and a telecommunication circuit.

9. An occupant judging device for a vehicle seat according to claim 7, wherein the load sensor includes a strain detecting device for electrically detecting a bending degree of the bending portion which bends in response to a weight applied to the vehicle seat.

10. An occupant judging device for a vehicle seat according to claim 1, wherein the second predetermined time is longer than the first predetermined time.

11. An occupant judging device for a vehicle seat provided with a seatbelt and mounted in a vehicle that includes a door, the occupant judging device comprising:
 a load sensor for detecting a load applied to the vehicle seat;
 a controller for calculating a detected load value based on an output from the load sensor and determining an occupant on the vehicle seat by comparing the detected load value and a predetermined threshold value; and
 wherein the controller judges that a child restraint device on the vehicle seat is installed by detecting a decrease state of the detected load value after the seatbelt is fastened being maintained for a first predetermined time when the seatbelt is fastened and the door is opened and the decrease state is being maintained for a second predetermined time when the seatbelt is fastened and the door is closed.

12. An occupant judging device for a vehicle seat according to claim 11, wherein the decrease state of the detected load value is represented either by a state in which a ratio of the detected load value to an approximate maximum value of the detected load value detected after the seatbelt is fastened falls below a predetermined ratio, or by a state in which the detected load value falls below a second predetermined value from a value over a first predetermined value.

13. An occupant judging device for a vehicle seat according to claim 11, wherein the first detecting means is a belt anchor switch.

14. An occupant judging device for a vehicle seat according to claim 11, wherein the second detecting means is a courtesy switch.

15. An occupant judging device for a vehicle seat according to claim 11, wherein the load sensor is provided at a sensor bracket having an upper fastener portion, a lower fastener portion, and a bending portion.

16. An occupant judging device for a vehicle seat according to claim 11, wherein the controller includes a CPU, filter, a courtesy switch input circuit, an anchor switch input circuit, and a telecommunication circuit.

17. An occupant judging device for a vehicle seat according to claim 11, wherein the load sensor includes a strain detecting device for electrically detecting a bending degree of the bending portion which bends in response to a weight applied to the vehicle seat.

18. An occupant judging device for a vehicle seat according to claim 11, wherein the second predetermined time is longer than the first predetermined time.

* * * * *